(12) United States Patent
Takeuchi (10) Patent No.: US 6,404,530 B1
(45) Date of Patent: Jun. 11, 2002

(54) SCANNING OPTICAL SYSTEM (75) Inventor: Shuichi Takeuchi, Saitama-ken (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 37 days.

(21) Appl. No.: 09/693,958

(22) Filed: Oct. 23, 2000

(30) Foreign Application Priority Data

Oct. 28, 1999 (JP) .......................................... 11-306422

(51) Int. Cl.[7] .............................................. G02B 26/08
(52) U.S. Cl. ........................ 359/196; 359/205; 359/207; 359/216
(58) Field of Search ......................... 359/196, 205–207, 359/212–219, 558, 563, 565, 569–570, 15–17

(56) References Cited

U.S. PATENT DOCUMENTS 5,838,480 A    11/1998   McIntyre et al.
6,094,286 A    7/2000    Kato
6,115,164 A    9/2000    Kamikubo
6,124,962 A    9/2000    Kamikubo

FOREIGN PATENT DOCUMENTS

| JP | 10-68903  | 3/1998 |
| JP | 10197820  | 7/1998 |

*Primary Examiner*—James Phan
(74) *Attorney, Agent, or Firm*—Greenblum & Bernstein, P.L.C.

(57) ABSTRACT

A scanning optical system is provided with a light source, a deflector that deflects a light beam emitted from the light source to scan in a main scanning direction, a scanning lens that converges the light beam deflected by the deflector on an imaging surface to form a spot which scans on the imaging surface in the main scanning direction, and a mirror arranged between the deflector and the imaging surface, the mirror bending an optical path of the laser beam between the deflector and the imaging surface. With this structure, the reflecting surface of the mirror has a diffraction surface to compensate for lateral chromatic aberration generated by the scanning lens.

9 Claims, 6 Drawing Sheets

SCANNING OPTICAL SYSTEM

BACKGROUND OF THE INVENTION

The present invention relates to a scanning optical system which can be employed in imaging devices such as a laser beam printer.

A conventionally known scanning optical system is provided with a laser source which emits a laser beam, a deflector such as a polygonal mirror, which deflects the laser beam emitted by the laser source to scan within a predetermined angular range, and a scanning lens such as an fθ lens which converges the deflected beam on an imaging surface to form a beam spot. As the laser beam scans within the predetermined scanning range, the beam spot moves on the imaging surface to form a scanning line thereon.

In general, the scanning lens of the scanning optical system as above is not designed to compensate for a lateral chromatic aberration, since the laser beam used in an imaging device has a single wavelength. Therefore, if the wavelength of the laser beam varies with respect to the designed wavelength due to individual differences of the laser diodes and/or changes of ambient temperature, a length of the scanning line varies due to the lateral chromatic aberration of the scanning lens. In such a case, accuracy of the image forming procedure becomes worse.

In order to compensate for the lateral chromatic aberration of the scanning lens, a diffraction surface like a surface of a Fresnel lens may be formed on a lens surface. Examples of such a configuration are described in Japanese Patent publications Nos. HEI 10-68903 and HEI 10-197820.

The diffraction surface has a plurality of stepped portions. In the above-identified publications, the diffraction surface is formed on a refraction surface of a refractive lens included in the scanning lens. In such a constitution, necessary phase shift should be achieved when a laser beam passes the diffraction surface once. Therefore, levels between adjacent steps (i.e., boundaries between adjacent stepped zones) tend to be relatively large. Such a structure is difficult to form accurately, and, due to processing error in forming the boundaries between respective steps, diffraction efficiency of the diffraction surface is lowered.

SUMMARY OF THE INVENTION

It is therefore an object of the invention to provide am improved scanning optical system having a diffraction surface that compensates for lateral chromatic aberration, in which reduction of diffraction efficiency due to processing error is avoidable.

For the above object, according to the present invention, there is provided a scanning optical system, which is provided with a light source, a deflector that deflects a light beam emitted from the light source to scan in a main scanning direction, a scanning lens that converges the light beam deflected by the deflector on an imaging surface to form a spot which scans on the imaging surface in the main scanning direction, and a mirror arranged between the deflector and the imaging surface, the mirror bending an optical path of the laser beam between the deflector and the imaging surface. With this structure, the reflecting surface of the mirror has a diffraction surface to compensate for the lateral chromatic aberration generated by the scanning lens.

Since the diffraction surface is formed on a reflecting surface located between the deflector and the imaging surface, optical path difference generated by the diffraction surface is twice, and a difference of levels between adjacent diffraction profiles can be suppressed relatively small in comparison with a case where such a diffraction surface is formed on a refraction surface of the scanning lens. Therefore, the diffraction surface can easily be manufactured accurately, and high diffraction efficiency can be obtained.

Optionally, the diffraction surface includes a part of a plurality of annular zones.

In this case, the mirror may be a front surface mirror. The mirror may be formed by injection molding and have a gate portion for injection The gate portion is preferably positioned closely adjacent to a center of the annular zones. With this structure, the injecting process can be achieved without fail.

Alternatively, the mirror may be a back surface mirror.

Optionally, the diffraction surface is formed on a base curve which is convex at least in the main scanning direction.

By forming the base curve to be convex in the main scanning direction, a bow caused by the diffraction power can be cancelled by the power generated by the base curve.

Alternatively, the base curve may be a flat surface, and the scanning system may be configured such that the light beam emitted from the light source is incident on the deflector at a predetermined angle in an auxiliary scanning section. With this configuration, the bow can also be cancelled.

Optionally, the scanning optical system may further include a cylindrical lens arranged between the light source and the deflector, the cylindrical lens forming a line-shaped image, elongated in the main scanning direction, of the laser beam. The scanning lens may include an anamorphic lens having a relatively strong positive power in the auxiliary scanning direction, the anamorphic lens being located relatively close to the imaging surface, and the anamorphic lens is arranged to be displaced in the auxiliary scanning direction with respect to an optical axis of the other lenses included in the scanning lens.

DETAILED DESCRIPTION OF THE EMBODIMENTS

Hereinafter, a scanning optical system 100 according to an embodiment of the present invention will be described with reference to the accompanying drawings.

Figure 1:
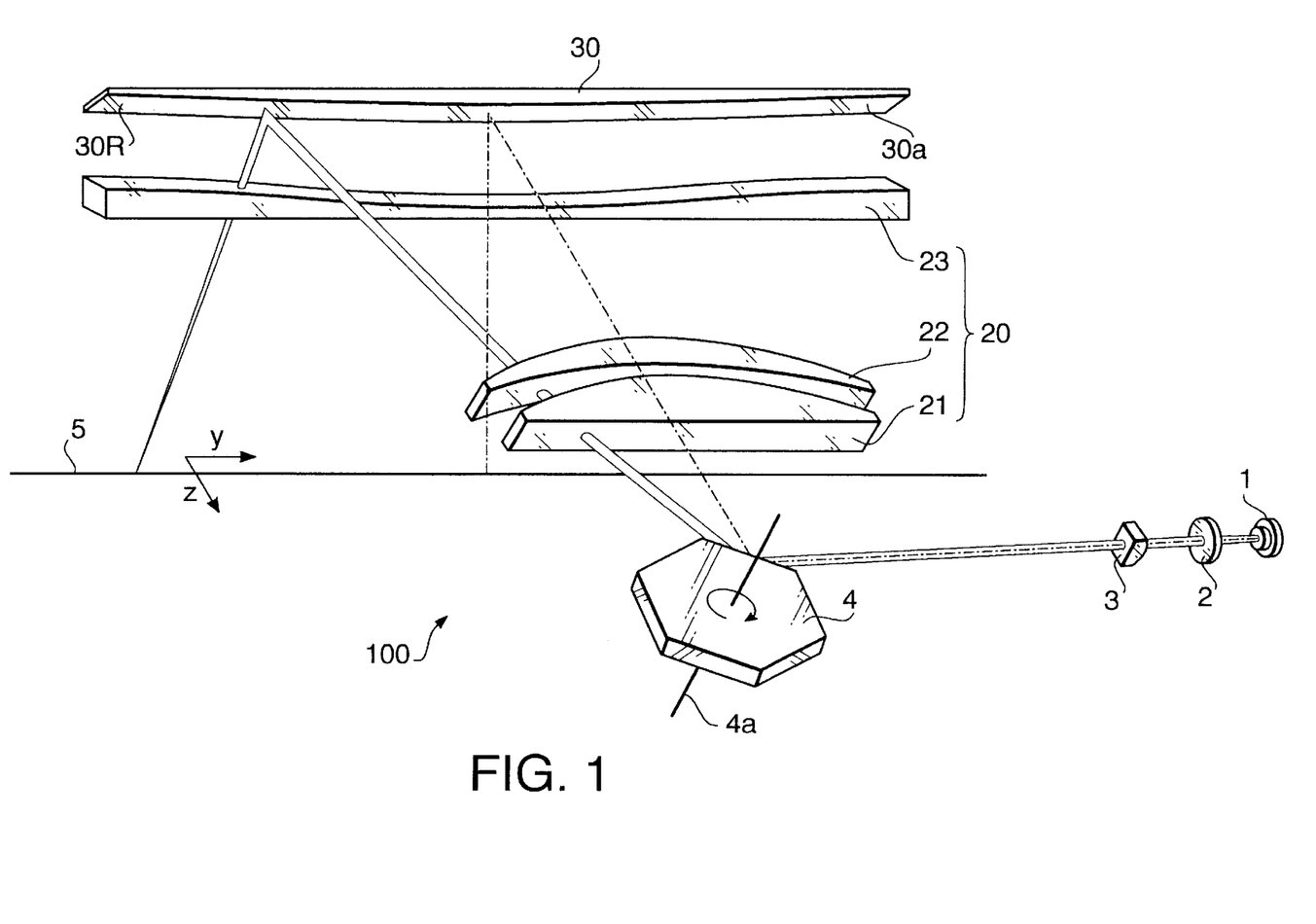
FIG. 1 is perspective view of a scanning optical system according to an embodiment of the present invention.

FIG. 1 schematically shows a perspective view of the scanning optical system 100 for a laser beam printer.

The scanning optical system 100 is provided with a laser diode 1, a collimating lens 2, a cylindrical lens 3, a polygonal mirror 4, an fθ lens 20, and a mirror 30. The laser diode 1 emits a laser beam, which is collimated by the collimating lens 2. The collimated laser beam passes through the cylindrical lens 3 and impinges on the polygonal mirror 4. The polygonal mirror 4 deflects the laser beam to scan within a predetermined angular range. The scanning laser beam deflected by the polygonal mirror 4 is incident on the fθ lens 20, which converges the laser beam on an imaging surface 5 via the mirror 30. The beam spot formed on the imaging surface moves in a predetermined direction, which will be referred to as a main scanning direction and indicated by arrow Y. Further, a direction, on the imaging surface, perpendicular to the main scanning direction will be referred to as an auxiliary scanning direction and is indicated by arrow Z.

Shapes and powers of each optical element are described with reference to the directions (i.e., the main scanning direction Y and the auxiliary scanning direction Z) on the imaging surface. Further, a plane that is perpendicular to direction Y and includes an optical axis of the fθ lens 20 will be defined as "an auxiliary scanning plane".

An fθ lens 20 has three lens elements, which are:

a first lens 21, which is a plano-convex lens;

a second lens 22, which is a positive meniscus lens; and a third lens 23, which is an anamorphic lens having strong positive power in the auxiliary scanning direction. The three lens elements 21, 22 and 23 are arranged in this order from the polygonal mirror side.

It should be noted that, as mentioned above, when it is described that the third lens 23 has positive power in the auxiliary scanning direction, the positive power of the third lens 23 affects the laser beam in the auxiliary scanning direction on the imaging surface.

In the present embodiment, the mirror 30 is a front surface mirror having a reflecting surface 30R on the front surface, i.e., the light incident side surface, thereof. Further, the reflecting surface 30R is formed with a diffraction surface 30a for compensating for a lateral chromatic aberration of the fθ lens 20. The mirror 30 is arranged such that the laser beam emerged from the second lens 22 is reflected by the reflection surface 30R and is incident on the third lens 23.

The laser beam emitted by the laser diode 1 is collimated by the collimating lens 2. The collimated laser beam is converged by the cylindrical lens 3, which has a positive power in the auxiliary scanning direction, to form a line-shaped image at a position closely adjacent to a reflection surface of the polygonal mirror 4. The polygonal mirror 4 is driven to rotate about a rotating axis 4a. The laser beam incident on the polygonal mirror 4 is deflected to scan in the main scanning direction by the reflection surfaces of the polygonal mirror 4. The deflected light beam (i.e., the scanning light beam) is converged on the imaging surface 5 through the first lens 21, the second lens 22, the mirror 30 and the third lens 23. The beam spot formed on the imaging surface 5 moves in the main scanning direction Y.

It should be noted that the scanning optical system 100 can easily be modified as a multi-beam type scanning optical system that is provided with a light source or a light sources emitting a plurality of light beams. In such a case, the plurality of light beams are parallel to each other, and arranged in the auxiliary scanning direction.

Next, the reflection surface 30R and the diffraction surface 30a of the mirror 30 will be described. It should be noted that, in the embodiment, the reflection surface 30R coincides with the diffraction surface 30a.

Figure 2A:
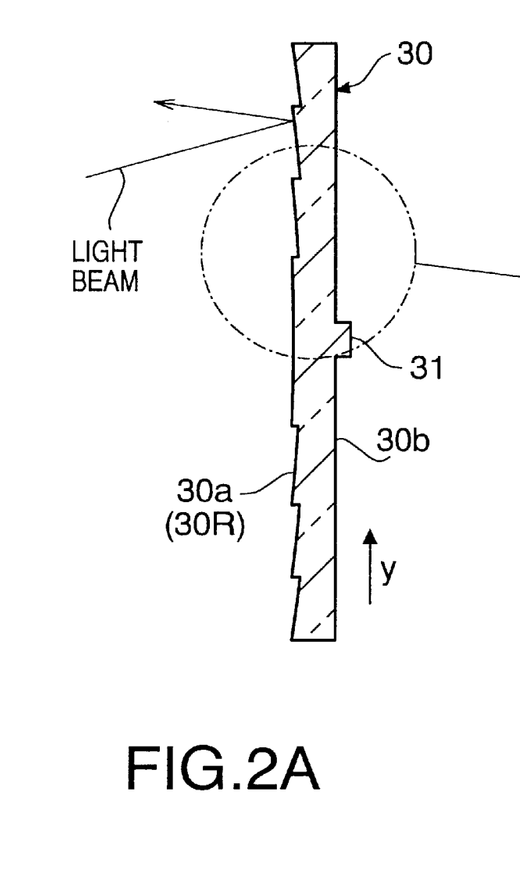
FIG. 2A schematically shows a cross-section of a mirror token along a plane including a central axis of the mirror and in parallel with a main scanning direction.
Figure 2B:
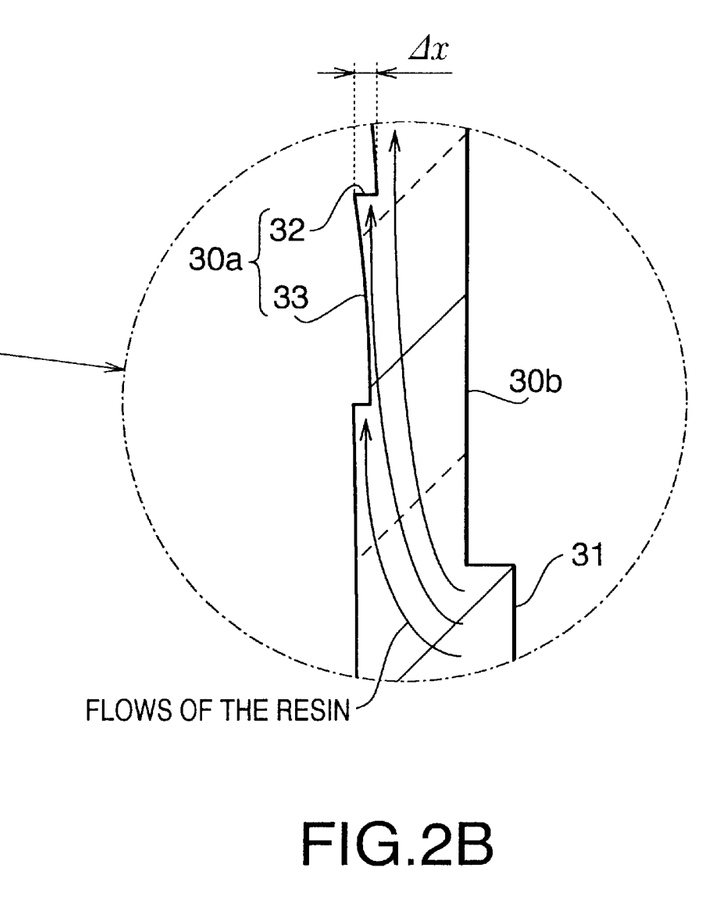
FIG. 2B is an enlarged view of a circled part of the mirror shown in FIG. 2A illustrating flow of material when the mirror is formed.
Figure 3:
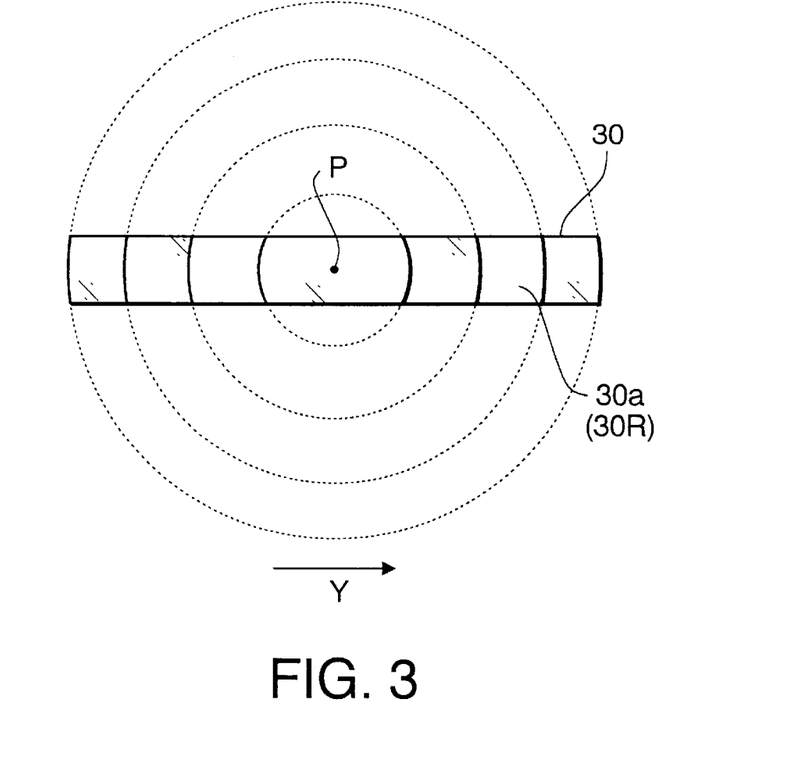
FIG. 3 is a front view of the mirror.

FIG. 2A is a cross sectional view of the mirror 30 taken along a plane including the central axis of the mirror 30 and in parallel with the main scanning direction Y. FIG. 2B is an enlarged view of a circled part of the cross section shown in FIG. 2A, which shows flow of resin when the mirror 30 is formed. FIG. 3 is a front view of the mirror 30. It should be noted that FIGS. 2A, 2B and 3 are conceptual drawings, and the number of annular zones of the diffraction surface shown in the drawings is much less than actual structure.

As shown in FIG. 3, the diffraction surface 30a of the mirror 30 is a substantially rectangular shape elongated in the main scanning direction Y. The diffraction surface 30a is formed as a part of a pattern having a plurality of concentric annular zones, which are formed as stepped zones. In FIG. 3, boundaries of the concentric annular zones outside the mirror 30 are indicated by broken lines, and P denotes the center of the concentric annular zones. In the embodiment, the center P coincides with the center of the diffraction surface 30a.

The mirror 30 is formed of a resinous block coated with aluminum. The resinous block is formed in accordance with a well-known injection molding process using a mold which is formed with a pattern corresponding to the diffraction surface 30a. A gate 31, through which the resin is injected in the mold when the block is formed, is provided on a rear surface 30b opposite to the diffraction surface 30a, at a central position thereon along the main scanning direction Y.

The diffraction surface 30a has a weak positive power for compensating for the lateral chromatic aberration of the fθ lens 20, which has a positive power. When the diffraction surface 30a is formed on a front surface of the mirror 30, as shown in FIG. 2B, each zone of the diffraction surface 30a has a perpendicular surface 32 which is perpendicular with respect to the main scanning direction and a gently sloped surface 33 descending from peripheral side to the central side of the mirror 30. As shown in FIG. 2B, a step is formed at each boundary between adjacent gently sloped surfaces 33. Accordingly, if the gate portion 31 is positioned at the central portion, in the main scanning direction, of the mirror 30, when the resin is injected into the mold, the resin flows as indicated by arrows in FIG. 2B, and the flow of resin is not prevented by the pattern. Accordingly, the mold can be filled well with the resin. Therefore, the pattern of the mold is transferred accurately.

As described above, if the diffraction surface 30a for compensating for the lateral chromatic aberration is formed on the mirror 30, but not on a refraction surface of a lens, the step height, which is a height between the surfaces 33 of the adjacent zones at the boundary, can be made smaller with respect to a case where the diffraction surface is formed on a refraction surface of a lens of the fθ lens.

This effect will be described specifically below. The step height Δx at the boundary of the zones on the diffractive surface will be expressed by following formula (1):

$$\Delta x = \frac{\lambda}{(n_o - n_i)} \quad (1)$$

where, λ represents a design wavelength;

$n_i$ represents a refractive index, at the design wavelength, of incident side material of the diffraction surface; and $n_o$ represents a refractive index, at the design wavelength, of a material on the light emerging side of the diffraction surface.

If the diffraction surface is formed on the refraction surface as in a conventional scanning lens, when λ=0.78 μm, $n_i$=1.0, and $n_o$=1.5, the step height Δx=1.56 μm. If the diffraction surface is formed on the reflection surface of the front surface of a mirror as in the present embodiment, when λ=0.78 μm, $n_i$=1.0, $n_o$=−1.0, the step height Δx=−0.39 μm, that is substantially a quarter of the step height of the diffraction surface formed on the refraction surface.

Figure 4:
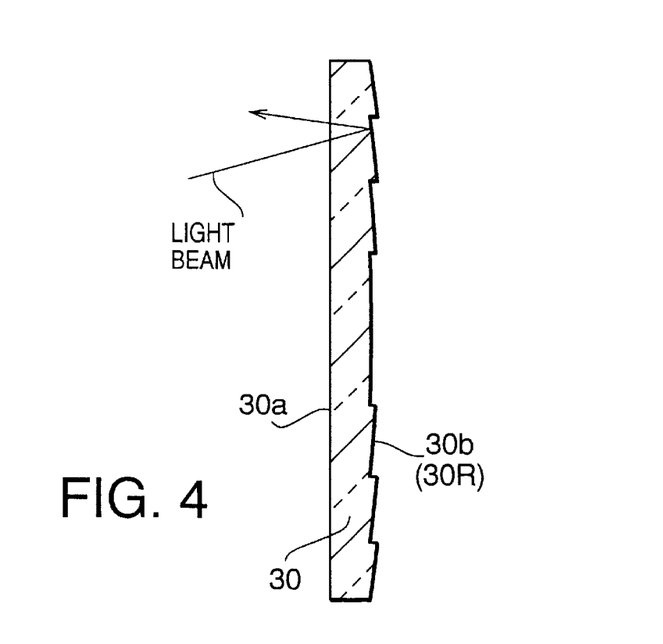
FIG. 4 schematically shows a cross-section of a back surface mirror according to a modified embodiment of the invention.

Alternatively, the mirror 30 can be formed as a back surface mirror having the reflection surface 30R as well as the diffractive surface on a back surface 30b of the mirror 30, as shown in FIG. 4. In this case, if the refractive index of the material is 1.5, the refractive index $n_i$=1.5 and the refractive index $n_o$=−1.5, then, the step height Δx=−0.26 μm, which is one-sixth of the step height in the case where the diffraction surface is formed on the refraction surface. Therefore, in this case, the mold can be formed more easily.

When the step height at the boundary is smaller, the mold can be formed easily, and therefore the shape of the mirror 30 can be formed accurately. This avoids lowering of the diffraction efficiency due to the error of the shape. Further, loss of quantity of light beam, and/or ghosting light generated by non-diffracted light and unused order diffraction components can also be decreased.

A relationship between the step height and a manufacturing error will be described hereinafter with reference to FIGS. 5A, 5B, 6A and 6B.

Figure 5A:
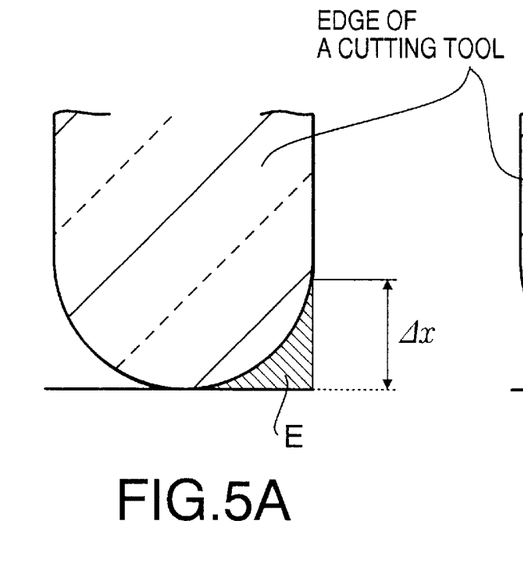
FIG. 5A shows processing error when a step height $\Delta x$ is relatively high.
Figure 5B:
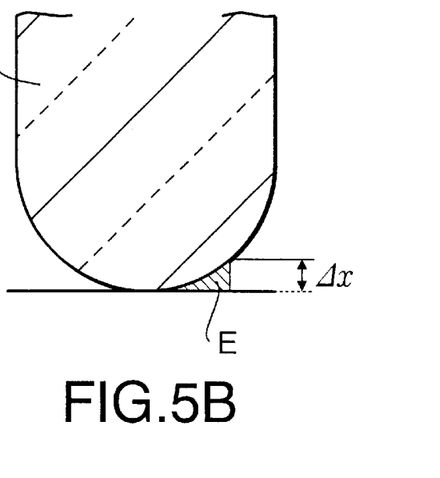
FIG. 5B shows processing error when the step height $\Delta x$ is relatively small.

FIGS. 5A and 5B show manufacturing errors when the step heights Δx are relatively high and small, respectively.

The mold for the diffraction surface 30a is produced using a cutting tool. Microscopically, an edge of the cutting tool has a round shape as shown in FIGS. 5A and 5B. If the mold is formed on the order of millimeters, the manufacturing error caused by the shape of the edge is not so important. However, if the accuracy of the order of submicrons is required as in a case where the mold for the diffraction surface is formed, the manufacturing error due to the edge shape of the cutting tool is important.

It is preferable that the perpendicular surface 32 and the gently sloped surface 33 form a substantially right angle at a corner where the perpendicular surface 32 and the gently sloped surface 33 intersect. However, due to the round shape of the cutting tool, such a structure cannot be obtained. It should be noted that, when the step height is relatively small as shown in FIG. 5B, a portion E which cannot be cut out by the cutting tool is relatively small, whereas when the step height is relatively high as shown in FIG. 5A, the remaining portion E which cannot be cut out by the cutting tool is relatively large.

Figure 6A:
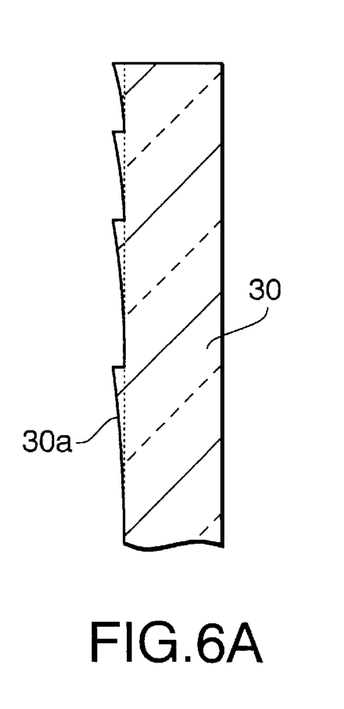
FIG. 6A is a enlarged view of the mirror whose base curve is planar.
Figure 6B:
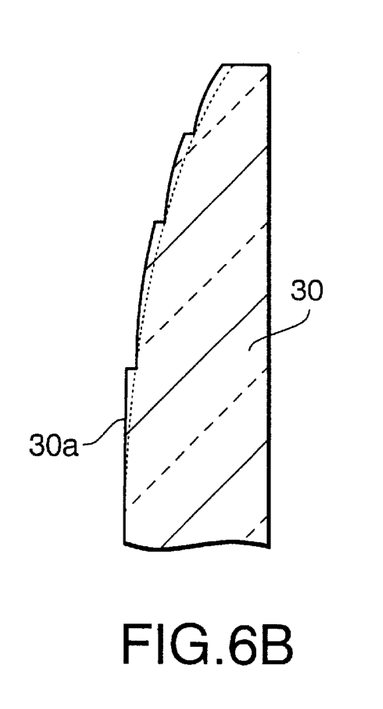
FIG. 6B is a enlarged view of a mirror whose base curve is convex.

When the mirror 30 is formed as a front surface mirror, as shown in FIG. 6A, if the base curve of the diffraction surface 30a (shown with the broken line in FIG. 6A) is a planar surface, the accuracy in forming the mold and in forming the resinous block (i.e., injecting resin material in the mold) is lowered since the above-describe angle between the perpendicular surface 32 and the gently sloped surface 33 is an acute angle. Accordingly, as shown in FIG. 6B, it is preferable that the base curve (shown by the broken line in FIG. 6B) is convexed, i.e., a surface on which the diffraction structure is formed is a convex surface having weak power. In such a case, the above-describe angle between the perpendicular surface 32 and the gently sloped surface 33 is an obtuse angle. Accordingly, the mold can be formed easily, and the accuracy of in forming the mirror 30 (i.e., injecting the material in the mold) can be increased.

Further, when the mirror surface 30R, on which the diffraction structure is formed, is a convex surface, bow (i.e., a curvature of a scanning line on the imaging surface 5) can be compensated. Namely, when the mirror 30 having a positive diffractive power, and extending in the main scanning direction, is arranged to bend the optical path in the auxiliary scanning direction, the scanning line on the imaging surface 5 is curved in the auxiliary scanning direction as a result of the diffractive power. If the reflection surface 30R is formed as a convex surface having a week negative power, the bow (i.e., the curvature of the scanning line) generated by the negative power of the reflection surface 30R cancels the bow (i.e., the curvature of the scanning line) generated by the positive diffractive power by the diffraction structure 30a. Therefore the bow is prevented.

Alternatively, even if the base curve is a planar surface, the bow due to the diffraction structure 30a can be compensated for by employing an arrangement such that laser beam emitted by the laser diode at an angle in the auxiliary scanning direction with respect to the polygonal mirror 4. With this arrangement, however, wavefront aberration on the imaging surface 5 becomes significant, in particular at high image height (at a peripheral portion in the main scanning direction). Therefore, in order to suppress the wavefront aberration, it is preferable that the third lens 23 of the fθ lens 20 is arranged decentered, in the auxiliary scanning direction, with respect to the optical axis of the first and the second lenses 21 and 22.

Numerical Embodiment

A numerical embodiment of the above-described scanning optical system will be described below.

In this numerical embodiment, the mirror 30 is a front surface mirror. The diffraction surface 30a is formed on the convex surface which serves as the base curve. The following TABLE 1 shows the lens arrangement of the scanning optical system 100 on the imaging surface 5 side with respect to the cylindrical lens 3. Symbol ry in the table 1 represents a radius of curvature (the unit is millimeter) in the main scanning direction, symbol rz represents a radius of curvature in the auxiliary scanning direction (which will be omitted if a lens surface is a rotationally-symmetrical surface), d represents a distance (the unit is millimeter) between surfaces on the optical axis, n is a refractive index at the design wavelength, i.e., 780 nm.

In TABLE 1, surface numbers #1 and #2 indicate the cylindrical lens 3, surface number #3 represents the light reflection surface of the polygonal mirror 4, surface numbers #4 and #5 indicate the first lens 21, surface numbers #6 and #7 indicate the second lens 22, surface number #8 represents the mirror 30, and surface numbers #9 and #10 represent the third lens 23.

TABLE 1

| Surface No. | ry | rz | d | n |
|---|---|---|---|---|
| #1 | inf. | 51.08 | 4.0 | 1.511 |
| #2 | inf. | — | 95.0 | |
| #3 | inf. | — | 32.0 | |
| #4 | inf. | — | 12.0 | 1.486 |
| #5 | −96.00 | — | 3.0 | |
| #6 | −160.00 | — | 8.0 | 1.486 |
| #7 | −88.00 | — | 68.0 | |
| #8 | 3500.00 | — | 15.0 | |
| #9 | −406.00 | 18.56 | 4.0 | 1.486 |
| #10 | −7200.00 | — | — | |

An inclination angle of the mirror 30 (the angle formed between a normal line at the center of the mirror 30 and the optical axis of the first and second lens 21 and 22 in the auxiliary scanning direction) is 25°.

Surface #1 is a cylindrical surface, surfaces #2, #3, and #4 are flat surfaces, surface #5 is a convex spherical surface, and surface #6 is a concave spherical surface. Surface #7 is a convex surface, which is aspherical and rotationally-symmetrical about the optical axis thereof. Surface #8 is a diffraction surface, whose base curve is a convex spherical surface. Surface #9 is an aspherical surface having no rotationally-symmetrical axis, a radius of curvature in the auxiliary scanning direction at a point spaced from the optical axis being determined independently of a cross-sectional shape of the lens in the main scanning direction. Hereinafter, surface #9 is referred to as a "progressive toric aspherical surface." Surface #10 is a convex spherical surface.

The rotationally-symmetrical aspherical surface (i.e., surface #7) can be expressed by the following formula (2):

$$X(h) = Ch^2/(1+\sqrt{1-(1+\kappa)C^2 h^2}) + A^4 h^4 + A^6 h^6 \ldots \quad (2)$$

where, $X(h)$ is a sag amount which is a distance of a point on the aspherical surface whose height from the optical axis is h with respect to a tangential plane on the aspherical surface on the optical axis;

C is a curvature (1/r) of the aspherical surface on the optical axis;

κ is a conical coefficient; and

A4, A6 are forth- and sixth-order aspherical coefficients, respectively.

In TABLE 1, the radius of curvature of the rotationally-symmetrical aspherical surface (i.e., surface #7) is that on the optical axis. The conical coefficient and the aspherical coefficients are shown in TABLE 2.

TABLE 2

| Surface No. | κ | A4 | A6 |
|---|---|---|---|
| #7 | 0.00 | $3.100 \times 10^{-7}$ | $-2.330 \times 10^{-11}$ |

The diffraction surface is defined by an additional amount of optical path length $\Delta\phi(h)$ at the position whose height with respect to the optical axis is h. When the additional path length $\Delta\phi(h)$ can be expressed by the following formula (3):

$$\Delta\phi(h) = P2h^2 + P4h^4 + P6h^6 + P8h^8 + P10h^{10} \ldots \quad (3)$$

where, P2, P4, . . . represent second, forth, sixth, eighth, and tenth order diffraction coefficients.

Each of the diffraction coefficients of the diffraction surface (i.e., surface #8) is shown in Table 3.

TABLE 3

| Surface No. | #8 |
|---|---|
| P2 | $-1.5159 \times 10^{-1}$ |
| P4 | $1.0869 \times 10^{-6}$ |
| P6 | $-4.3265 \times 10^{-14}$ |
| P8 | $3.2563 \times 10^{-19}$ |
| P10 | $5.7530 \times 10^{-24}$ |

The progressive toric aspherical surface can be expressed by the following formulae (4) and (5):

$$X(y) = Cy^2/(1+\sqrt{1-(1+k)C^2 y^2}) + A4y^4 + A6y^6 \ldots \quad (4)$$

$$1/rz(y) = (1/rz_o) + AS1xy^1 + AS2xy^2 + AS3xy^3 + AS4xy^4 \ldots \quad (5)$$

where, $X(y)$ is a sag amount of a point on a curve, at which the progressive toric aspherical surface and a plane including the optical axis and extending in the main scanning direction intersect, the sag amount being a distance of the point, whose Y coordinate is represented by y, from a line tangent to the progressive toric aspherical surface on the optical axis and parallel to the main scanning direction;

$rz(y)$ is a radius of curvature of an arc including the above point, whose Y coordinate is y, on the curve, the arc defining the progressive toric aspherical surface in the auxiliary scanning direction, the center of the arc being located on the plane including the optical axis and extending in the main scanning direction;

C is a curvature (1/ry) of the aspherical surface on the optical axis;

κ is a conical coefficient; and

A4, A6 are forth- and sixth-order aspherical coefficients, respectively.

$rz_o$ (see rz in Table 1) is the radius of the curvature in the auxiliary scanning direction on the optical axis;

AS1, AS2, AS3, AS4 are coefficients which determine the radius of the curvature in the auxiliary scanning direction.

Table 4 shows the values of the surface number 9.

TABLE 4

Figure 7A:
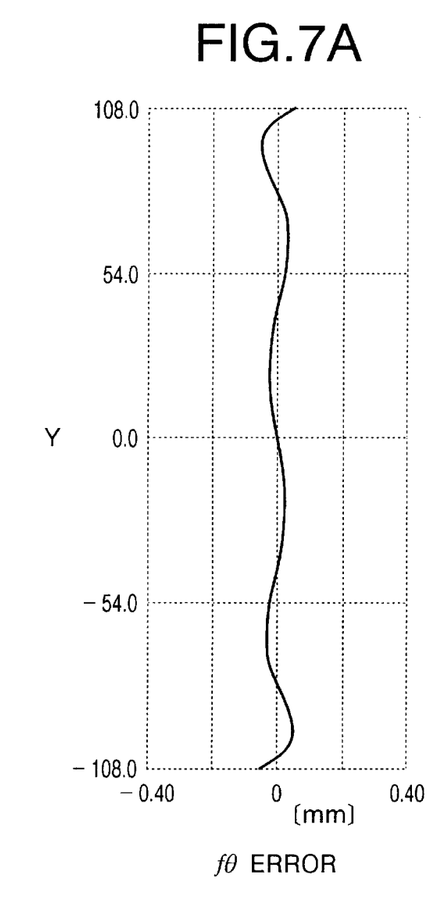
FIG. 7A is a graph showing an fθ error of a scanning optical system of the embodiment of the present invention.
Figure 7B:
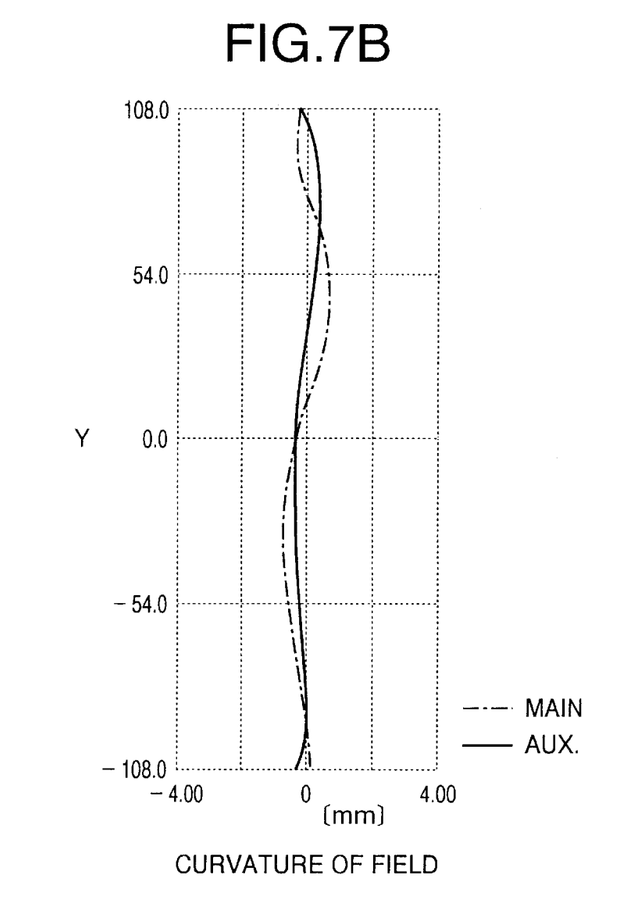
FIG. 7B is a graph showing a curvature of field of the scanning optical system.

Surface No.: #9
κ = 0.000
A4 = $1.640 \times 10^{-7}$
A6 = $-7.200 \times 10^{-12}$
AS1 = $-2.800 \times 10^{-6}$
AS2 = $-2.460 \times 10^{-6}$
AS3 = 0.000
AS4 = $1.200 \times 10^{-10}$ FIGS. 7A, 7B, 8A and 8B are graphs showing the performance of the scanning optical system 100 according to the numerical embodiment described above. FIG. 7A shows an fθ error (i.e., a displaced amount of the beam spot on the imaging surface 5 from its ideal position). FIG. 7B shows a curvature of field (i.e., a displace amount of a focal point, in the direction of the optical path, from paraxial image plane). In FIG. 7B, a broken line represents the curvature of field in the main scanning direction, and a solid line represents the curvature of field in the auxiliary scanning direction.

Figure 8A:
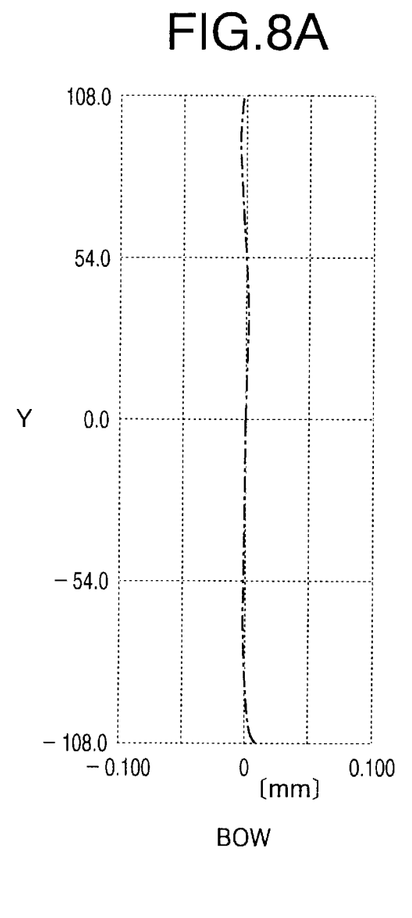
FIG. 8A is graph showing a bow (i.e., a curvature of a scanning line) of the scanning optical system of an embodiment of the present invention.
Figure 8B:
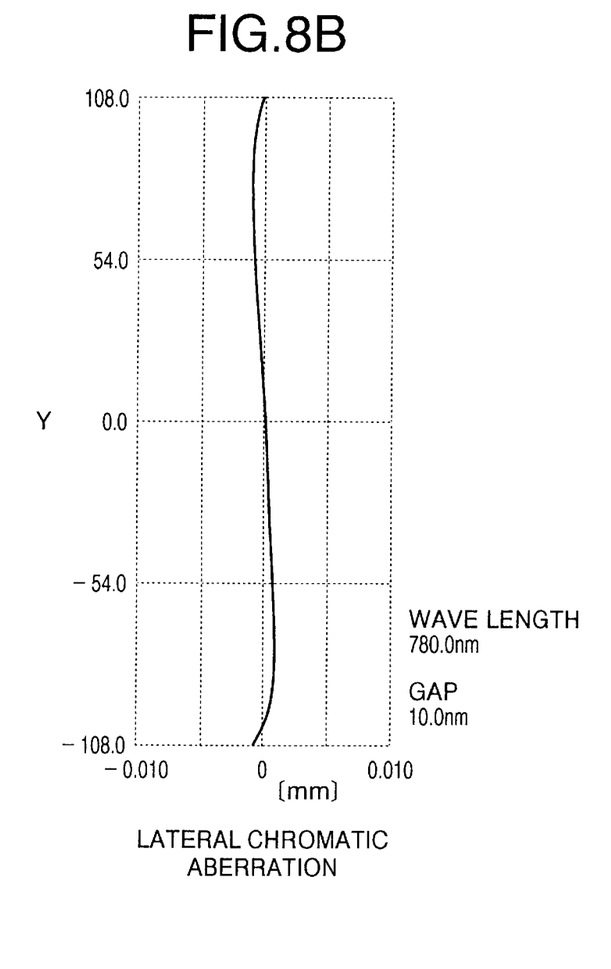
FIG. 8B is a graph showing a lateral chromatic aberration of the scanning optical system.

Further, FIG. 8A shows the bow (i.e., the curvature of the scanning line, or a displacement amount of the beam spot in the auxiliary scanning direction). FIG. 8B shows lateral chromatic aberration (i.e., the displaced amount of the beam spot) when the wavelength of the laser beam is different from the design wavelength (780 nm) by 10 nm.

In each graph of FIGS. 7A, 7B, 8A and 8B, the axis of ordinate represents the distance of the beam spot in the main scanning direction with respect to a position at which the imaging surface and the optical axis intersect, and the axis of abscissa represents the amount of each aberration. The unit of measurement in FIGS. 7A, 78, 8A and 8B is millimeter.

Since the reflection surface 30R of the mirror 30 is formed as diffraction surface 30a, the lateral chromatic aberration can be suppressed to a small amount as shown in FIG. 8B. Further, since the base curve of the diffraction surface 30a is a convex surface having a small refractive power, the bow can also be suppressed to a small amount as shown in FIG. 8A.

As described above, according to the present invention, since the diffraction surface for compensating for the lateral chromatic aberration of the scanning lens is formed on a mirror surface that is arranged between the polygonal mirror and the imaging surface, the step height of the diffraction surface can be made smaller than that of the conventional diffraction surface. Accordingly, the accuracy in forming the mold, and in forming the mirror in accordance with the injection molding process can be made higher. Further, the lowering of the diffraction efficiency of the diffraction surface due to the manufacturing error is prevented. Furthermore, a performance of the image formation can be maintained at high quality.

The present disclosure relates to the subject matter contained in Japanese Patent Application No. HEI 11-306422, filed on Oct. 28, 1999, which is expressly incorporated herein by reference in its entirety.

What is claimed is:

1. A scanning optical system, comprising:

a light source;

a deflector that deflects a light beam emitted from said light source to scan in a main scanning direction;

a scanning lens that converges the light beam deflected by said deflector on an imaging surface to form a spot which scans on said imaging surface in said main scanning direction; and a mirror arranged between said deflector and said imaging surface, said mirror bending an optical path of the light beam between said deflector and said imaging surface, wherein the reflecting surface of said mirror has a diffraction surface to compensate for the lateral chromatic aberration generated by said scanning lens.

2. The scanning optical system according to claim 1, wherein said diffraction surface includes a part of a plurality of annular zones.

3. The scanning optical system according to claim 2, wherein said mirror is a front surface mirror.

4. The scanning optical system according to claim 3, wherein said mirror is formed by injection molding.

5. The scanning optical system according to claim 4, wherein said mirror has a gate portion for injection, said gate portion positioned closely adjacent to a center of said annular zones.

6. The scanning optical system according to claim 1, wherein said mirror is a back surface mirror.

7. The scanning optical system according to claim 1, wherein said diffraction surface is formed on a base curve which is convex at least in said main scanning direction.

8. The scanning optical system according to claim 1, a light beam emitted from said light source is incident on said deflector at a predetermined angle in an auxiliary scanning section.

9. The scanning optical system according to claim 8, further including cylindrical lens arranged between said light source and said deflector, said cylindrical lens forming a line-shaped image, elongated in said main scanning direction, of the light beam, wherein said scanning lens includes an anamorphic lens having a relatively strong positive power in the auxiliary scanning direction, said anamorphic lens being located relatively close to said imaging surface, and wherein said anamorphic lens is located displaced in the auxiliary scanning direction with respect to an optical axis of the other lenses included in said scanning lens.

* * * * *